United States Patent

[11] 3,613,773

| [72] | Inventors | William B. Hall<br>Landisville;<br>Fred G. Block, Lancaster, both of Pa. |
|---|---|---|
| [21] | Appl. No. | 418,946 |
| [22] | Filed | Dec. 7, 1964 |
| [45] | Patented | Oct. 19, 1971 |
| [73] | Assignee | RCA Corporation |

[54] CONSTANT TEMPERATURE OUTPUT HEAT PIPE
5 Claims, 8 Drawing Figs.

[52] U.S. Cl. .................................................... 165/32,
165/105, 176/50, 310/4
[51] Int. Cl. ........................................................ F28d 15/00
[50] Field of Search .......................................... 165/31, 32,
104–106; 236/27; 237/12.1, 70; 310/4; 176/50,
54, 57

[56] References Cited
UNITED STATES PATENTS

| 2,026,423 | 12/1935 | Fiene ............................ | 165/105 X |
| 2,581,347 | 1/1952 | Backstrom ..................... | 165/105 X |
| 3,330,130 | 7/1967 | Schraith et al. ............... | 62/259 |
| 3,229,759 | 1/1966 | Grover .......................... | 165/105 |

Primary Examiner—Albert W. Davis, Jr.
Attorney—Glenn H. Bruestle

ABSTRACT: A heat pipe is provided with a noncondensible gas reservoir at the condenser end. The pressure of the gas and the size of the reservoir are selected to prevent a large change in the operating pressure, and thus the operating temperature, if the heat input to the heat pipe decreases.

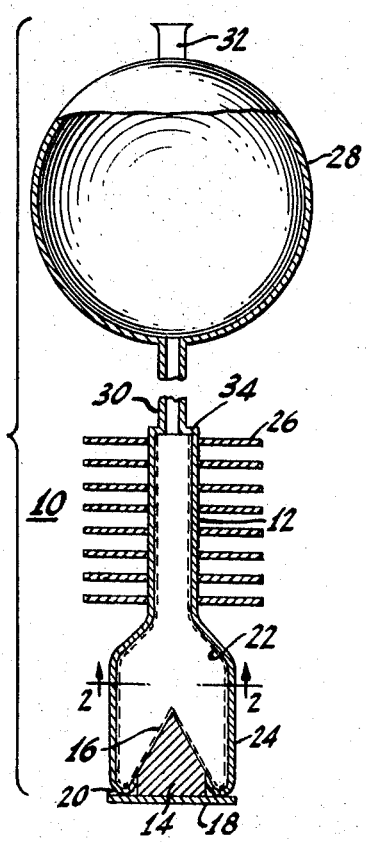
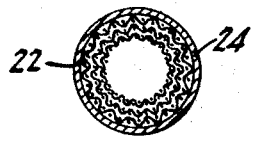
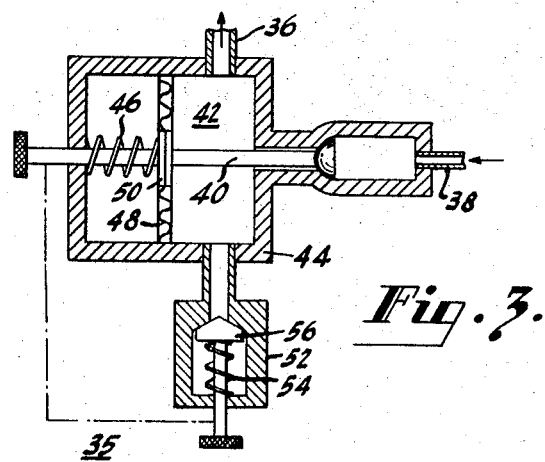
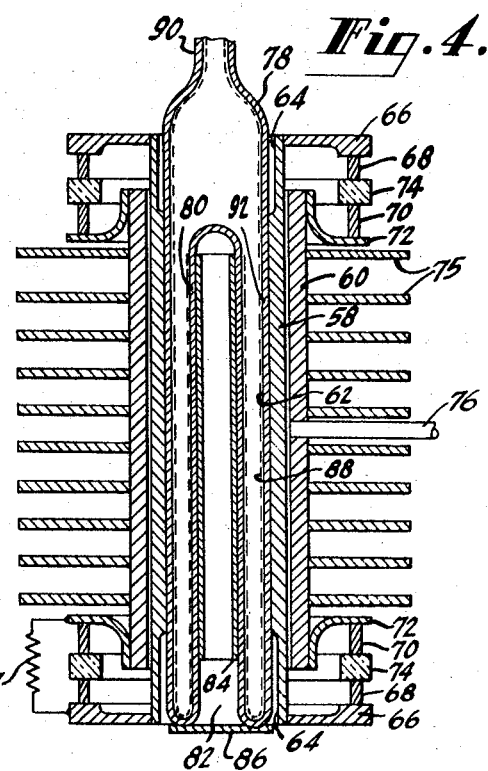
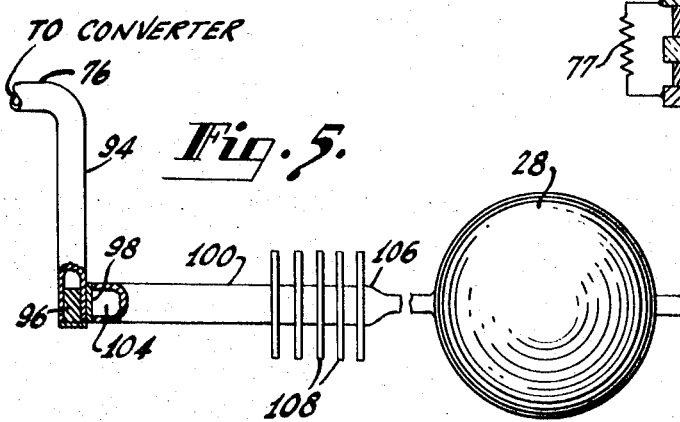
INVENTORS
WILLIAM B. HALL &
BY FRED G. BLOCK

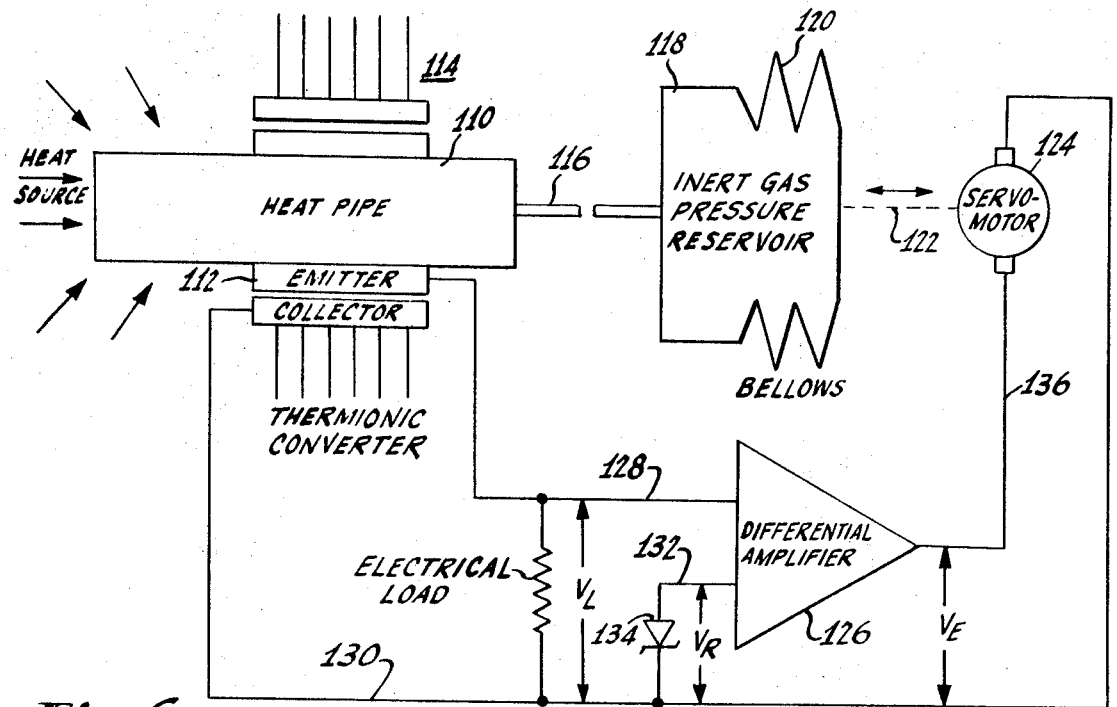
Fig. 6.
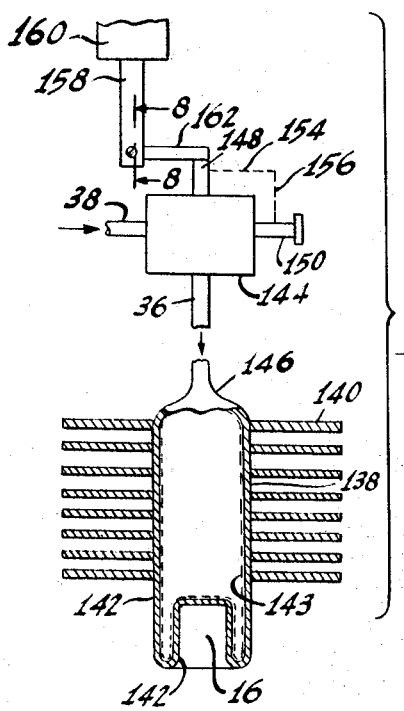 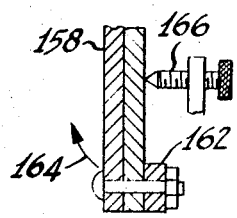
Fig. 7. Fig. 8.
INVENTORS
WILLIAM B. HALL &
FRED G. BLOCK
BY
L. A. Larsen
Attorney

3,613,773

CONSTANT TEMPERATURE OUTPUT HEAT PIPE

The present invention relates to heat exchangers and particularly to an apparatus and method for controlling heat transfer.

One type of heat exchange apparatus comprises a structure including an envelope containing a vaporizable heat transfer medium. One portion of the envelope is associated with a source of heat or heat zone, and another portion of the envelope comprises a heat utilization zone. The inner wall of the envelope is lined with a material having capillary openings therein, the lining extending at least from the heat zone to the utilization zone.

This type of heat exchange apparatus effects heat transfer from the heat zone to the heat utilization zone by causing the heat zone to vaporize the heat transfer medium within the envelope for permeating at least the portion of the envelope wall adjacent to the heat utilization zone. If the envelope portion adjacent to the heat utilization zone is sufficiently cool, the heated vapor of the heat transfer medium condenses thereon. Such condensation releases to the heat utilization zone, the heat of evaporation of the transfer medium. Where water is used as the heat transfer medium, the heat of evaporation released to the utilization zone is about 500 calories for each gram of water condensed. The condensed water is collected by the capillary lining and is propelled through the lining by capillary action, to the heat zone where it is reevaporated.

Heat exchange apparatus of this type comprises a tubular structure in many applications, and therefore may be referred to conveniently as a heat pipe.

Heat exchange devices or heat pipes of the type referred to can be used in any application wherein it is desired to effect heat transfer from a heat source or zone to a utilization zone or load. Heretofore, the amount of heat (calories per second) delivered to a load has been dependent upon the amount of heat transfer by the heat source to the heat transfer (working) medium. When the amount of heat so transferred by the heat source is reduced, such as by decay in the heat generated at the heat zone, the heat received by the load is also decreased. Such decrease in heat at the load decreases the temperature of the load. The term "temperature" indicates a parameter of heat measured in degrees on one of several conventional scales.

In many applications, it is desirable to control a condition such as temperature or pressure, at a load independently of the rate of heat transfer by the heat zone to the working medium. The term "control" as used herein, is intended to indicate the establishment of one of several conditions at the load, such as constancy of the temperature thereof, constancy of the vapor pressure thereat, or modulation or change in either or both the temperature and vapor pressure at the load.

Heat exchange devices of the type described in the foregoing, as heretofore known, cannot provide the aforementioned desirable controls. Thus, a constant temperature at the utilization zone is not feasible with a fuel source of changing or decaying heat value. This is because a change in the amount of heat transferred by the heat zone to the working medium will produce a change in the pressure of the vapor within the device. Such a change in pressure results in a change in temperature of the vapor or working medium. The heat utilization zone, which has a temperature determined by the temperature of the vapor, will also be characterized by a similar change in temperature. Furthermore, when the heat of the heat zone is stabilized, the temperature at the utilization zone is also stabilized, so that conventional heat exchange devices cannot be operated to provide a modulation of the temperature at the utilization zone.

Accordingly, it is an object of the invention to provide a heat exchange apparatus wherein the temperature at a utilization zone is independent of the amount of heat at a heat zone.

Another object is to provide a heat exchange apparatus for obtaining a stabilized temperature at a utilization zone from a heat source of variable heat quantity.

A further object is to provide a controllable heat exchange apparatus for obtaining a variable temperature at a utilization zone, from a heat zone of stabilized heat quantity.

Another object is to provide a method of controlling the temperature at a heat utilization zone of a heat transfer apparatus by controlling the pressure of a vapor utilized in such apparatus.

A further object is to provide a method for controlling the pressure of a gas at a utilization zone of a heat exchange apparatus in response to the temperature at the utilization zone.

These and other objects of the invention may be realized in a number of applications, two of which will be considered by way of example. One application concerns a thermionic energy converter and the other is a house heating system.

Several features of the invention are associated with thermionic energy converters. One feature concerns an advantageous utilization of a decaying fuel source, such as a radioisotope, for obtaining a stabilized temperature of a cathode or emitter of a converter. Another feature involves stabilizing the pressure of a cesium vapor employed in some types of thermionic energy converters. Another feature concerns a stabilization of the emitter temperature of thermionic energy converters under changing load conditions, by causing the voltage output from the converter to control the pressure of a vapor employed in heating the cathode of such converters.

Features related to a controllable house heating system include the provision of a single duct serving the functions of conducting a heating medium to a heat utilization or heat consumption zone, and permitting return flow of the heating medium by capillary action. This feature is accompanied by the advantages of rendering unnecessary a forced circulating system for a heat medium, and the circulation effected by the system of the invention is more rapid and effective than in systems relying on convection for circulation.

In the drawings,

FIG. 1 is a sectional elevation of a heat exchange apparatus or heat pipe, having one form of vapor pressure control means that keeps a vapor employed in such apparatus at a substantially constant pressure;

FIG. 2 is a transverse sectional view taken along the line 2—2 of FIG. 1 and shows one type of capillary fluid return means that may be employed in accordance with the invention;

FIG. 3 is a sectional view of another type of pressure control means that may be utilized in practicing the invention;

FIG. 4 is a sectional elevation of a thermionic energy converter in heat transfer relation with respect to a heat pipe according to the invention;

FIG. 5 is a side view partly in section showing a heat pipe in heat transfer relation with respect to a source of cesium employed in the thermionic energy converter shown in FIG. 4;

FIG. 6 is a schematic illustration of a system for controlling the vapor pressure of a heat pipe in response to voltage fluctuations of an associated thermionic energy converter;

FIG. 7 shows a partly schematic and partly sectionalized view of a house heating system employing the feature of temperature control by the pressure of a gas on a vapor according to the invention; and FIG. 8 is a sectional view taken along the line 8—8 of FIG. 7 and shows a feature of the pressure control means depicted in FIG. 7.

A heat exchange apparatus of general application is shown in FIG. 1. The apparatus comprises a heat pipe 10 provided with an envelope 12 having therein a vaporizable heat transfer medium. The heat transfer medium may be selected for properties adapting it for use under any desired condition of a temperature and vapor pressure. Where a temperature of about 1,400° C. is desired, lithium may be used as the heat transfer or working medium. A heat source 14, which may be a radioisotope such as polonium 210, is preferably positioned in a reentrant portion 16 of the envelope, to reduce wasteful loss of heat from the heat source. To assure good heat transfer from the heat source 14 to the wall of the reentrant portion 16, the heat source and wall may have a conical structure. A plate 18 extending across and sealing the opening into the space defined by the reentrant portion 16, is fixed to the annular shoulder 20 in any suitable way such as by welding or brazing. Disposed in close proximity to the inner walls of the heat pipe 10 is a capillary means 22 which, as shown in FIG. 2, may comprise 3 layers of a wire mesh having openings of capillary size. The heat utilization zone of the heat pipe is preferably located at a lower region 24 of the envelope for a reason that will become evident as the description proceeds. Excessive heat at regions of the heat pipe spaced from the heat utilization zone 24, may be dissipated by suitable means such as radiators 26.

Disposed above the heat pipe 10, as viewed in FIG. 1, is a container 28 having a tube 30 providing communication with the heat pipe. Within container 28 is an inert gas such as helium, at a pressure required to maintain the vapor of the working medium in the heat pipe at a temperature called for by the heat utilization zone 24. Where lithium is used as the working medium, this pressure may be about 1,000 millimeters of mercury.

In order that this pressure be preserved substantially constant during operation of the apparatus, the container is made large enough to define a volume appreciably larger than that of the heat pipe 10. In one example, the volume of the container 28 was ten times as large as that of the heat pipe 10.

In fabricating the apparatus shown in FIG. 1, the heat pipe envelope 12, with the reentrant portion 16 and the capillary lining 22, is first formed. A charge of lithium in solid state is deposited within the envelope 12 in a sufficient amount to fully permeate the inner space of the envelope 12 when fully vaporized at a pressure to satisfy the temperature requirements at the heat utilization zone 24 and to completely fill the capillary structure 22 with lithium in the liquid phase.

The heat pipe envelope 12 formed and charged in accordance with the foregoing, is then joined to container 28 by means of a tubulation 30, and the envelope 12 and container 28 are both evacuated and out-gassed to a relatively low pressure through tubulation 32. The out-gassing temperature may be 1,400° C., and at this temperature lithium is in both the vapor and liquid phase, and is distributed in the heat pipe in such a way that the liquid collects in the capillaries of the lining 22 and vapor permeates the interior of the pipe. An inert gas such as helium is then fed into the container 28 through the tubulation 32. The initial pressure of the gas introduced is such that when the lithium vapor fills the heat pipe envelope 12, its pressure will in this example, be 1,000 millimeters of mercury. Since the working medium is in a solid state at this stage of manufacture, the helium gas introduced into the container 28 will fill the envelope 12. In view of this, the gas pressure after initial introduction should be 10 percent less than when the working medium is vaporized. In the instant example, therefore, the initial pressure of the gas should be 900 millimeters of mercury. After gas in an amount to secure this pressure has been introduced into the container 28, the container is sealed by hermetically closing the tubulation 32 in any suitable way.

Thereafter, the heat source 14 is placed in the opening defined by the reentrant portion 16 and the plate 18 is secured in place for confining the heat source. Where the heat source 14 is in the form of a radioisotope, it initially heats the wall of the reentrant portion 16 to at least the operating temperature of the working medium, such as lithium. As the vapor of the working medium is formed, it expands throughout the envelope 12 until it reaches its maximum volume. This maximum volume will cause the vapor to reach a region adjacent to the end 34 of the heat pipe envelope adjacent to the container 28. The formation of the vapor is effected in such rapid fashion that it reduces the volume of gas in the heat pipe by a process similar to that occurring in diffusion pumps. That is to say, the velocity of the molecules of lithium vapor formed during the vaporization process which continuously occurs, is such that the lithium molecules carry with them the gas molecules with which they come into contact, thereby preserving an interface between the volume of gas and the volume of vapor. This interface is preserved during operation of the heat exchange apparatus as a consequence of the continuously repeated cycles of lithium vapor condensation and lithium vaporization. The resultant continuous vaporization process imports appreciable kinetic energy to the vapor molecules. This kinetic energy is expended in contacts with molecules of the helium gas. The appreciable character of the kinetic energy of the vapor molecules in such contacts, prevents the vapor from diffusing into the gas and results in the aforementioned interface which is present at all times during operation of the apparatus. The realization that the formation of such interface between a volume of vapor and a volume of gas is feasible is an important feature of the present invention.

Where the heat source 14 comprises a radioisotope, it is characterized by a decay in heat output with time. For example, polonium 210 has a half life of 0.38 years. Thus, in a little over 3 months its heat output is reduced by one-half. As this reduction in heat output occurs, the pressure of the working vapor is decreased with a consequent decrease in temperature. However, in accordance with the invention, the gas within the container 28 continues to preserve the pressure of the working vapor substantially at its initial value, so that the temperature at the utilization zone 24 is kept substantially constant during the decay in the heat output from the heat source. The maximum drop in temperature that can occur at the heat utilization zone 24 is no more than that which occurs in response to a 10 percent drop in pressure. At such a drop in temperature the gas within the container 28 will have entered the heat pipe 12 and reached a region close to the heat utilization zone 24. It is for this reason that the heat utilization zone 24 is disposed near the heat source as hereinbefore noted.

Changes in volume of the vapor can occur in response to either a change in heat input thereto, or a change in the heat demand at the heat utilization zone. The interface between the gas and vapor will move in response to such changes in volume of the vapor. The location of the interface is governed by the density of the vapor. The density of the vapor rapidly decreases due to condensation and its pressure decreases. The gas volume rapidly expands and thus complements the decreasing volume of the vapor, thus causing the interface to move.

In operation, when the working vapor, such as lithium, permeates the space within the heat pipe envelope 12, it will condense on cooler regions of the heat pipe. The heat utilization zone 24 from which heat is extracted, is cooler than the heat input zone 16. As a consequence, the lithium vapor will condense at the heat utilization zone 24. The condensate will be propelled by the capillary lining 22 to the reentrant portion 16 of the heat pipe where it will be vaporized again. In condensing, the vapor gives up an appreciable amount of heat. The heat, in calories per second, so given up raises the heat utilization zone to a given temperature, which when lithium is used as the working medium, is about 1,400° C. By virtue of the stored gas pressure in container 28, this temperature will be kept at a substantially constant value. The temperature will be subjected to a maximum drop as defined by a 10 percent drop in pressure throughout a relatively long period, that is at least as long as four half lives of the radioisotope employed.

During operation of the apparatus with a radioisotope, more heat may be produced than is needed at the heat utilization zone. The radiators 26 are provided to dissipate the excess heat. The excess heat, if not dissipated by the radiators, would cause the temperature of the heat utilization zone to increase. This would adversely affect the constancy of the temperature at such zone.

It will be noted that the capillary lining 22 extends upwardly to the end 34 of the heat pipe. The purpose of this upward extension is to cause return to the heat zone, i.e., the reentrant portion 16, of any portion of the working medium that may be condensed on upper regions of the heat pipe.

The heat pipe 10 can be operated in any position. However, it is preferred to position the heat pipe 10 in a vertical position with the heat source down, to facilitate capillary return aided by gravity of condensed working medium to the region of the heat source 14.

During the initial stages of operation of the apparatus shown in FIG. 1, all portions of the envelope 12 may be heated to a working temperature. Therefore, a substantial portion of the envelope 12 may be employed as the heat utilization zone 24. However, excessive length of the heat utilization zone may be undesireable during any appreciable length of time in view of a contraction of the working vapor in the heat pipe in response to decay of the heat source 14.

A ratio of 10 to 1 between the volumes of the container 28 and the heat pipe envelope 12, results in a maximum drop of about 1 percent in the temperature in the heat utilization zone. However, even a 1 percent drop in temperature at the heat utilization zone may not be tolerable in certain applications. To avoid any drop in the temperature at the utilization zone 24, a more exact control in the pressure of the vapor compression gas (helium) than that obtainable by the relatively large volume container 28, may be provided according to the invention. In accomplishing such more exact control of the gas pressure during fluctuations in the vapor volume, a pressure control valve 35 of the type shown in FIG. 3 may be employed. This valve includes an outlet tubulation 36 that may be sealed to the upper end 34 (FIG. 1) of the heat pipe 10. The valve also includes an inlet tubulation 38 connected to a source (not shown) of a gas under sufficiently high sustained pressure that any pressure lost therein resulting from compensations for reduced volume in the vapor heat pipe, will not reduce the source pressure below the maximum pressure required in operation of the heat pipe 10. Such pressure at the pressure source will therefore be appreciably higher than the pressure of the gas admitted to the heat pipe. To reduce such higher pressure to the pressure required within the heat pipe 10, the valve structure includes an elongated valve member 40 movable axially to either close or open communication between inlet tubulation 38 and a chamber 42 within the valve housing 44. Normally, the member 40 is urged by a spring 46 to open position, thereby permitting gas from the high pressure source to enter the chamber 42 through the tubulation 38. As the gas pressure in chamber 42 is increased, it causes deflection of a diaphragm 48 to the left as viewed in FIG. 3. One end of the valve member 40 engages the diaphragm 48 through a washer 50. The diaphragm 48 is fixed hermetically to the inner wall of the housing 44. When a pressure of a value determined by spring 46 is developed in chamber 42, the valve member 40 is moved to the left in response to the deflection of the diaphragm 48 so that it closes communication between the inlet tubulation 38 and the chamber 42.

As the vapor volume in the heat pipe 10 is contracted in response to decay of the heat source 14 (FIG. 1), the gas pressure in chamber 42 is decreased. At the beginning of such decrease in gas pressure, the spring 46 moves the valve member 40 to open position to immediately restore the pressure in chamber 42 at the value determined by spring 46. Since the action of the valve is instantaneous, there is no significant change in the pressure of the gas that controls the pressure of the working vapor in the heat pipe. Consequently, the temperature of the working vapor is preserved constant. This renders the temperature of the heat utilization zone 24 also constant.

A safety valve 52 may be connected to the chamber 42 for preventing excessive build up of pressure therein or for modulating gas pressure, in a manner to be described. In any event, where the safety valve 52 is used, the force of a spring 54 acting on valve member 56 should be adjusted to a value to provide pressure release only at a pressure slightly larger than the pressure established in chamber 42, for a reason that will become apparent.

One important application of a heat pipe is for heating the cathode or emitter of a thermionic energy converter to a temperature required for electron emission. Converters of this type are usually diodes having a cathode for producing electron emission and an anode or collector for collecting the emission. In order to obtain an electrical output from such converter it is necessary to heat the cathode to an emitting temperature. For an output of practical value it is desirable to heat the cathode to a relatively high temperature such as about 1,400° C., for example. In the operation of a thermionic energy converter it is desirable that the electrical output therefrom be characterized by a substantially constant value. Since the output is dependent upon the temperature of the cathode, it is desirable to use a heating system for the cathode that is substantially free from temperature fluctuations. A heat exchange apparatus, according to the invention, provides this type of desirable heating system.

In FIG. 4, one type of thermionic energy converter is shown in operative association with the heat utilization zone of a heat pipe according to the invention. The thermionic energy converter may comprise a hollow cylindrical refractory emitter 58 coaxially and closely surrounded by a metal collector 60 of similar shape. The emitter 58 comprises a relatively large area thick intermediate portion 62 and two thin end portions 64. The emitter 58 and the collector 60, which form parts of the tube envelope, are connected at each end in electrically insulated relation by a series of annular metal members 66, 68, 70 and 72 and a ceramic ring 74, which are brazed or otherwise sealed together and to the emitter and collector, to complete the envelope. Preferably, a small amount of cesium is provided within the envelope to be vaporized during operation of the tube. The cesium vapor is vaporized as by impact ionization or contact ionization at the hot emitter surface, to produce positive ions in the discharge space between the emitter and collector, to neutralize the electron space charge and thereby increase the tube current. The collector 60 may be provided with cooling means, such as a plurality of heat radiating fins 75. A tube 76, sealed through the collector 60, may be used to supply cesium to the interior of the tube in a manner to be described. A load 77 may be connected across the emitter and collector through metal elements 66, 72.

In order to heat the emitter or cathode 58 to an emitting temperature which may, for example, by 1,400° C., a heat pipe, according to the invention, is employed. The heat pipe comprises an envelope 78 having a reentrant portion 80 defining a tubular space 82 within which is deposited an elongated charge 84 of a radioisotope such as polonium 210. An end cap 86 serves to seal the opening to the tubular space 82. The inside walls of the envelope 78 and the reentrant portion 80 are provided with a capillary lining 88 which may comprise several plies of capillary wire mesh such as plies 22, shown in FIG. 2. The envelope 78 has a transverse dimension for snugly fitting into the space defined by the emitter 58. The reentrant portion 80 of the heat pipe preferably has a length substantially coextensive with the active region of the emitter 58 to be heated. The upper end 90 of the heat pipe is connected to means (not shown in FIG. 4) for supplying to the heat pipe a gas such as helium under a pressure of about 1,000 millimeters of mercury when lithium is employed, as the working vapor in the heat pipe. Such means may comprise a gas reservoir 28 (FIG. 1) or a pressure control valve 35 (FIG. 3).

The heat utilization zone 92 of the heat pipe, in the example under consideration, may extend from a region adjacent to the lower end of the thick portion 62 of the emitter 58 to a location adjacent to the upper end of the thick emitter portion, as viewed in FIG. 4. In this way, the heat utilization zone is relatively close to the region of the heat source 84. This contributes to a more rapid heat transfer from the heat source to the heat utilization zone.

The heat pipe associated with a thermionic energy converter, as shown in FIG. 4, may be operated in a manner previously described in connection with FIGS. 1 and 3. In this example, (FIG. 4), lithium is used as the working vapor in view of its temperature about 1,400° C. at a pressure of 1,000 millimeters of mercury, which is sufficiently close to the temperature to which the emitter 58 is desirably raised in operation.

For good operation of the thermionic energy converter shown in FIG. 4, it is desirable that the pressure of the cesium vapor used therein be at a constant value. Such constant pressure of the cesium may be achieved by the use of a form of the novel heat pipe of the invention shown in FIG. 5. In this form the heat pipe serves as a variable heat load to keep the temperature and pressure of the cesium in the converter constant. As shown in FIG. 5, the inlet tube 76, sealed through the collector envelope portion of the converter, (FIG. 4), has a downwardly extending arm 94 (FIG. 5) closed at its lower end and containing a reservoir 96 of cesium. Adjacent to the outer wall of arm 94 and thermally connected to the cesium reservoir 96 is a heat zone 98 of a heat pipe 100. The cesium reservoir is the heat source for the heat pipe. The reservoir obtains its heat by thermal conduction from the collector of the thermionic converter. The heat pipe includes a capillary lining 104 extending from one end to the other of the pipe. The working medium of the heat pipe may be cesium vapor. The end 106 of the heat pipe is connected to gas pressure control means such as a container 28, also shown in FIG. 1. Heat radiators 108 serve to dissipate any excessive heat transferred to the reservoir from the collector. As the heat flux transferred from the collector changes due to load changes in the converter or due to any other cause for heat increase such as solar radiation, the heat pipe will automatically compensate by either activating more or less radiation fins 108 by movements of the vapor-gas interface as previously described.

This arrangement results in the production of a constant or substantially constant temperature and thus a constant pressure at the cesium reservoir.

Another use for a heat pipe of the invention in association with a thermionic energy converter is in applications wherein it is desirable to maintain a constant voltage output from a converter regardless of fluctuations in the electrical load or thermal input conditions.

In FIG. 6 there is shown schematically an arrangement for regulating the output potential of thermionic energy converters with a feedback mechanism that will translate fluctuations in output voltage into compensating changes in emitter temperature. This arrangement includes a heat pipe 110 in heat transfer relation with an emitter 112 of a thermionic energy converter 114, that may, e.g., be similar to the arrangement shown in FIG. 4. However, instead of connecting the heat pipe 110 to a source of constant or substantially constant gas pressure, as shown in FIGS. 1 and 3, the heat pipe is connected by means of a tubulation 116 to an inert gas reservoir 118 of variable gas pressure. The reservoir container includes a bellows portion 120, and the gas within the container may be helium. The reservoir container and bellows may be made of a metal suitable for conditions of temperature and erosion encountered in a particular application. In one example, the metal comprised stainless steel. A suitable shaft 122 connects one end of the bellows 120 to a servomotor 124 of a type commercially available. The servomotor 124 is energized by an error signal $V_E$ applied by a differential amplifier 126 of a type obtainable commercially. One input to the differential amplifier is fed by a lead 128 from the emitter 112. Another input comprises a reference voltage $V_R$ fed to the amplifier 126 by leads 130, 132 and a rectifier 134. The output from the amplifier is fed to one terminal of the servomotor 124 by a lead 136, and the collector voltage of the thermionic energy converter 114 is fed by lead 130 to the other terminal of the servomotor.

In this arrangement, any change in load condition which tends to cause a change in the output potential of the converter, will unbalance the differential amplifier 126. The unbalance difference between the reference voltage $V_R$ and the converter output voltage will cause an amplified error signal $V_E$ to operate the servomotor 124. The servomotor 124 serves to convert a voltage input thereto into axial movements of the shaft 122. When the voltage output from the thermionic energy converter is below the reference voltage $V_R$, the shaft 122 is moved outwardly from the servomotor 124, thereby contracting the bellows 120 and increasing the pressure of the gas within the reservoir 118. This increased gas pressure increases the pressure of the vapor within the heat pipe 110 with a consequent increase in its temperature. Such increased temperature is transferred to the emitter 112 with a consequent increase in its emission, for returning the voltage output of the converter to the reference voltage $V_R$. On the other hand, if the output voltage of the converter 114 should be excessive, the energy fed to the servomotor 124 will cause it to retract the shaft 122, thereby reducing the pressure of the gas in reservoir 118 as well as the temperature of the vapor in the heat pipe 110. This in turn will lower the temperature of the emitter 112 and reduce its emission, and thereby restore the voltage output from the converter 114 to the reference voltage $V_R$. In this way, the voltage output from the converter 114 is kept constant in spite of changes in load condition.

A further use for a heat pipe according to the invention is in association with a house heating system, shown in FIGS. 7 and 8. In such system a heat utilization zone 138 of a heat pipe may be placed in a room to be heated. Heat radiators 140 may be provided for radiating heat from the heat utilization zone. The lower end 142 of the heat utilization zone 138 may be heated by a suitable fuel, not shown. This lower end may be provided with a reentrant portion 16 having a heat source (not shown) therein, such as a flame instead of a radioisotope 14, as depicted in FIG. 1. The heat source may be placed in a region remote from the room in which the heat utilization zone 138 is placed by suitably elongating the heat pipe envelope 142. The heat pipe includes an envelope 142 having a capillary lining 143 therein which may be of the type shown at 22 in FIG. 2, for returning the condensed working or heating medium to the region of the heat source. Water vapor can be used as the working medium.

For controlling the pressure of the vapor and consequently its temperature in the heat utilization zone 138, an arrangement is provided comprising a pressure control valve 144 adapted to feed a gas such as air under controlled pressure to the heat utilization zone envelope 142 through a tube 146. The pressure control shaft 148 and a pressure release shaft 150 tied together in a suitable way such as by bevel gears 154, 156, shown schematically, so that rotation imparted to one of the shafts causes rotation of the other shaft also. Screw threads by which the shafts 148, 150 engage the housing of the valve 144 are such that the pressure determined by the shaft 150 is at all times slightly greater than the pressure determined by shaft 148.

In order to translate temperature changes in the room into changes in heat output from the heat utilization zone 138, a thermostat arrangement may be employed comprising a bimetallic element 158 fixed at one end to a support 160 and at the other end engaging a lever 162 fixed to the free end of shaft 148 of the valve 144. As shown in FIG. 8, the bimetallic element 158 may be so constructed as to be deflected in the direction of arrow 164 upon an increase of temperature in the room. Such deflection will cause the lever 162 to be moved to the left as viewed in FIG. 8, thereby rotating valve shafts 148, 150. This direction of deflection should be so related to the direction of the screw threads by which the shafts 148, 150 engage the housing of the valve 144 as to cause both shafts to be rotated to a position wherein the pressure of the gas admitted to the heat utilization zone 138 is increased, with a consequent reduction in heat output therefrom. Upon decrease in temperature in the room, the bimetallic element 158 will be deflected to the right as viewed in FIG. 8 to decrease the gas pressure admitted by valve 144 and thereby increasing the heat output from the heat utilization zone 138.

The bimetallic element 158 may be so constructed as to be normally rectilinear at a given temperature. A determination of the maximum deflection of the bimetallic element to the right, for increasing the heat output from the zone 138 (FIG. 7) may be effected by a screw 166. The screw 166 (FIG. 8) may have temperature calibrations thereon (not shown) so that it can be set to any desired temperature. Such a desired temperature will be maintained by the gas pressure acting on the vapor at the heat utilization zone 138.

While several examples of the invention have been described in the foregoing, it is not intended that the invention be limited thereto. Indeed, the invention is useful in a number of additional applications.

One of such additional useful applications of the invention is for heating the passenger compartment of automobiles. In this application, a part of the automobile that is heated in operation, such as an exhaust manifold or muffler, may serve as the heat input zone of a heat pipe, and the heat utilization zone may be the passenger compartment of the automobile.

Another additional example of a use for the invention, is a heating means associated with a thermoelectric device. The fuel may comprise a heat source of decaying heat output with time, such as a radioisotope. The heat utilization zone may comprise a thermoelectric junction, such as a thermocouple or a silicon-germanium thermoelectric element, which requires a constant temperature in order to avoid degradation in performance.

The heat exchanger of the invention will also find utility in maintaining a constant temperature in ambients of exothermal chemical reactions.

It is to be understood that the foregoing applications do not exhaust areas of usefulness of the invention. Indeed, heat exchange apparatus of the invention will find utility in a wide variety of additional applications. Thus, the novel heat exchange apparatus may be employed at temperatures ranging from the cryogenic to the highest temperature permitted by available materials.

Where the heat exchange apparatus is used at relatively high temperatures such as 1,400° C. and higher, the heat pipe envelope should be made of a refractory material such as a high temperature ceramic, or a refractory metal such as molybdenum. At low temperatures the composition of the heat pipe is not critical except for reasons of erosion. Stainless steel can be used advantageously where the temperature of operation permits.

The working medium should be of a type that has a desired vapor pressure at the temperature of operation. At a moderate temperature of operation, water is an effective working fluid. At relatively high temperatures silver may be used and at relatively low temperatures the working fluid may be freon.

Furthermore, in practicing the invention, it is not necessary that a wide temperature difference exist between the heat input zone and the heat utilization zone. While some temperature differences between these zones is necessary, it may be as small as is required to transport the working vapor from the heat zone to the heat utilization zone.

We claim:
1. A heat exchange apparatus comprising:
   a. a first envelope having a wall,
   b. a heat source adjacent to a first outer surface region of said wall,
   c. a heat utilization zone comprising a second outer surface region of said wall spaced from said first region,
   d. capillary means adjacent to the inner surface of said wall and extending from said first to said second region,
   e. a working vapor medium within said envelope and adapted to be converted to its vapor phase at a predetermined pressure by heat transfer to a first inner wall portion of said envelope in register with said first outer surface region, and to be condensed on the region of said capillary means in register with said second outer wall region,
   f. means for providing said predetermined pressure comprising a gas source communicating with said envelope, and
   g. a second envelope containing said gas source, said envelope having a larger volume than the volume of said first envelope.
2. A heat exchange apparatus comprising:
   a. an envelope having a heat input zone and a heat utilization zone spaced therefrom;
   b. capillary means within said envelope extending from said heat input zone to said heat utilization zone;
   c. a vaporizable working medium within said envelope for vaporizing in said heat input zone and for condensing in said heat utilization zone; and
   d. means for keeping the pressure of the vaporized working medium substantially constant comprising a volume of gas communicating with said envelope, said volume of gas being greater than the volume of said envelope.
3. The heat exchange apparatus of claim 2, wherein said volume of gas is proximate to said heat utilization zone.
4. The heat exchange apparatus of claim 2, wherein said volume of gas is about 10 times the volume of said envelope.
5. The heat exchange apparatus of claim 2, wherein said gas is an inert gas.